(12) United States Patent
Liao

(10) Patent No.: US 7,187,537 B2
(45) Date of Patent: Mar. 6, 2007

(54) PORTABLE COMPUTER WITH POSITION-ADJUSTABLE KEYBOARD

(75) Inventor: Chih-Cheng Liao, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 11/338,803

(22) Filed: Jan. 25, 2006

(65) Prior Publication Data
US 2006/0181842 A1    Aug. 17, 2006

(30) Foreign Application Priority Data
Feb. 14, 2005    (TW) .............................. 94104248 A

(51) Int. Cl.
*G06F 1/16* (2006.01)
(52) U.S. Cl. ..................... 361/680; 400/682
(58) Field of Classification Search ................. 361/680
See application file for complete search history.

(56) References Cited

U.S. PATENT DOCUMENTS

| | | | | |
|---|---|---|---|---|
| 5,818,360 A * | 10/1998 | Chu et al. ..................... 341/22 |
| 6,091,600 A * | 7/2000 | Jeong .......................... 361/680 |
| 6,191,937 B1 * | 2/2001 | Bang .......................... 361/681 |
| 6,314,274 B1 * | 11/2001 | Kumagai .................... 455/90.3 |
| 6,529,370 B1 * | 3/2003 | Kamishima ................. 361/680 |
| 2004/0012918 A1 * | 1/2004 | Chen .......................... 361/683 |
| 2004/0012919 A1 * | 1/2004 | Chen .......................... 361/683 |
| 2004/0141283 A1 * | 7/2004 | Chou .......................... 361/680 |

* cited by examiner

*Primary Examiner*—Lynn Feild
*Assistant Examiner*—Anthony Q. Edwards
(74) *Attorney, Agent, or Firm*—Birch, Stewart, Kolasch & Birch, LLP.

(57) ABSTRACT

A portable computer with a position-adjustable keyboard is used to provide a comfortable typing environment. More space is laid out for accommodating the keyboard, and the act of opening the panel is used to move the keyboard position. An adjustment mechanism is installed around a rotation shaft of the portable computer. A first gear is mounted on and rotated simultaneously with the rotation shaft. A cylinder is positioned adjacent to the rotation shaft, and a second gear is mounted thereon. A wire, rolled around the cylinder, interconnects the position-adjustable keyboard and the cylinder. When the panel is unfolded, the first gear rotates with the panel, and drives the second gear. The wire, pulled by the cylinder, moves the position-adjustable keyboard to the desired position for comfortable typing.

6 Claims, 6 Drawing Sheets

PORTABLE COMPUTER WITH POSITION-ADJUSTABLE KEYBOARD

RELATED APPLICATIONS

The present application is based on, and claims priority from, Taiwan Application Serial Number 94104248, filed Feb. 14, 2005, the disclosure of which is hereby incorporated by reference herein in its entirety.

BACKGROUND

1. Field of Invention

The present invention relates to a portable computer. More particularly, the present invention relates to a portable computer with a position-adjustable keyboard.

2. Description of Related Art

As a portable computer is popular in the market, it has become essential equipment in a modern office. Thus, using this essential equipment is no longer limited to short-term or out-of-office use. Some users even use the portable computer to replace a desktop computer in the office routine.

FIG. 1 is a schematic side view of a conventional portable computer. A distance between a rim of a base unit 104 and a keyboard 106 of a conventional portable computer 100 is further than that of a common keyboard. When a conventional portable computer 100 is used as a desktop computer, a user's wrist 108 must rest on the base unit 104, forming a gap 110 between a desk and his forearm. That is, when a user is typing, his forearm is suspended. If the user needs to type for a long time, the forgoing circumstances may tire his arm.

SUMMARY an objective of the present invention provides a portable computer with a position-adjustable keyboard so as to provide a comfortable typing environment.

In accordance with the foregoing and other objectives of the present invention, a portable computer with a position-adjustable keyboard is disclosed. More space is laid out for adjusting the keyboard, and the act of opening the panel is used to move the keyboard position. An adjustment mechanism is installed around a rotation shaft of the portable computer. A first gear is mounted on and rotated simultaneously with the rotation shaft. A cylinder is positioned adjacent to the rotation shaft, and a second gear is mounted thereof. A wire, rolled around the cylinder, interconnects the position-adjustable keyboard and the cylinder. When the panel is unfolded, the first gear rotates with the panel, the second gear is driven by the first gear. The wire, pulled by the cylinder, moves the position-adjustable keyboard to the desired position for comfortable typing.

Thus, when the portable computer with a position-adjustable keyboard is used, a user can enjoy a comfortable typing environment. Besides, the adjustment mechanism provides a torsion force to position the panel of the portable computer, on behalf of a hinge.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
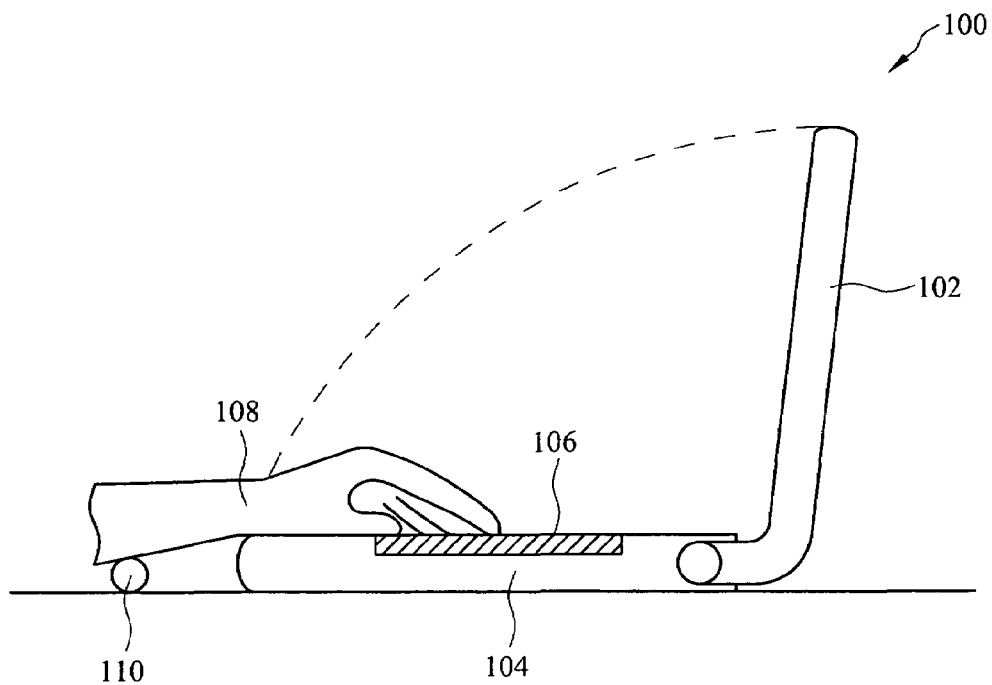
FIG. 1 is a schematic side view of a conventional portable computer.

Reference will now be made in detail to the present preferred embodiments of the invention, examples of which are illustrated in the accompanying drawings. Wherever possible, the same reference numbers are used in the drawings and the description to refer to the same or like parts.

In order to provide a comfortable typing environment, present invention provides a portable computer with a position-adjustable keyboard. By enlarging a keyboard accommodation space, a keyboard can be adjusted to a comfortable position within the accommodation space. When the keyboard is unfolded from a base unit, a keyboard can be adjusted to a similar position, like a common keyboard, which is used to control a desktop computer.

Figure 2:
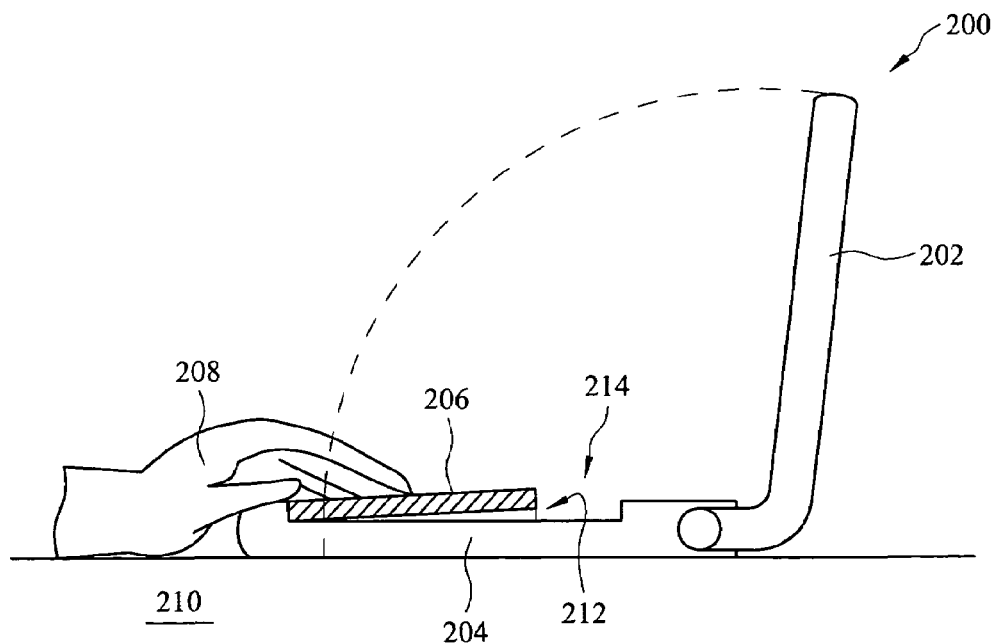
FIG. 2 is a schematic side view of a portable computer according to one preferred embodiment of this invention.

FIG. 2 is a schematic side view of a portable computer according to one preferred embodiment of this invention. FIG. 1 illustrates a desired keyboard position, achieved by the present invention. When a panel 202 of a portable computer 200 is unfolded, a keyboard 206, accommodated in a keyboard section 214, is moved to a position closer to a rim of the base unit 204. When a user is typing, his wrist 208 rests comfortably on the desk 210. Moreover, the keyboard 206 is slanted by 6–9 degrees to form a more comfortable environment for typing.

Figure 3:
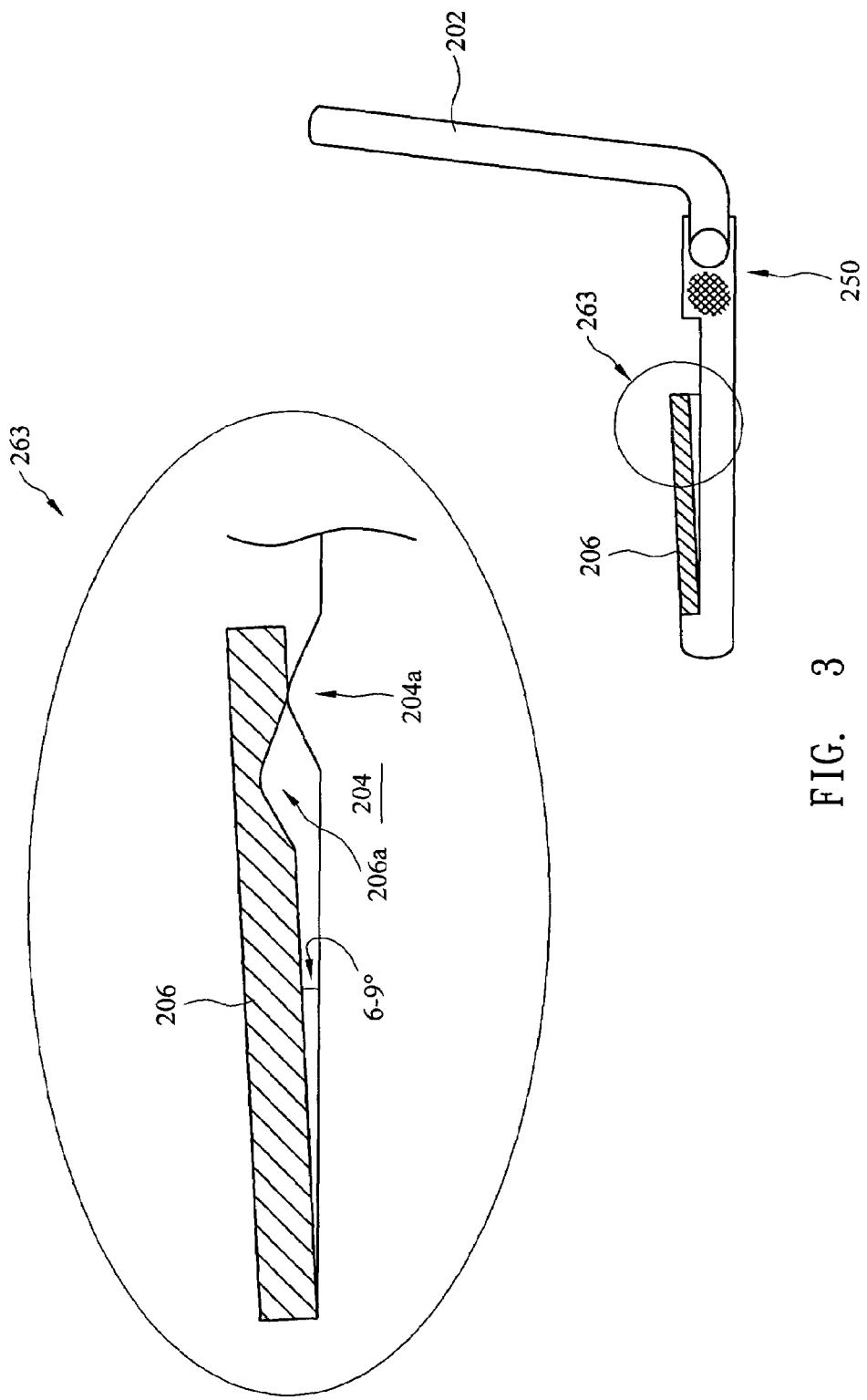
FIG. 3 is a schematic, cross-sectional view of a raising mechanism according to one preferred embodiment of this invention.

FIG. 3 is a schematic, cross-sectional view of a raising mechanism according to one preferred embodiment of this invention. When a panel 202 of a portable computer 200 is unfolded, a keyboard 206 is moved to a closer position towards a rim of the base unit 204 and is slanted by 6–9 degrees. The keyboard 206 is moved by an adjustment 250, which is described in the next paragraph. FIG. 3 illustrates a raising mechanism 263, which enables the keyboard 206 to be slanted by 6–9 degrees. The enlarged view provides a schematic cross-section of the keyboard 206 and the base unit 204. When the panel 202 is folded on the base unit 204, a concave section 206a of the keyboard 206 fits with a convex section 204a so that the keyboard 206 is level with an upper surface of the base unit 204. When the panel 206 is unfolded, the keyboard is moved to the left, and the convex section 204a raises one side of the keyboard 206 by 6–9 degrees.

Figure 4:
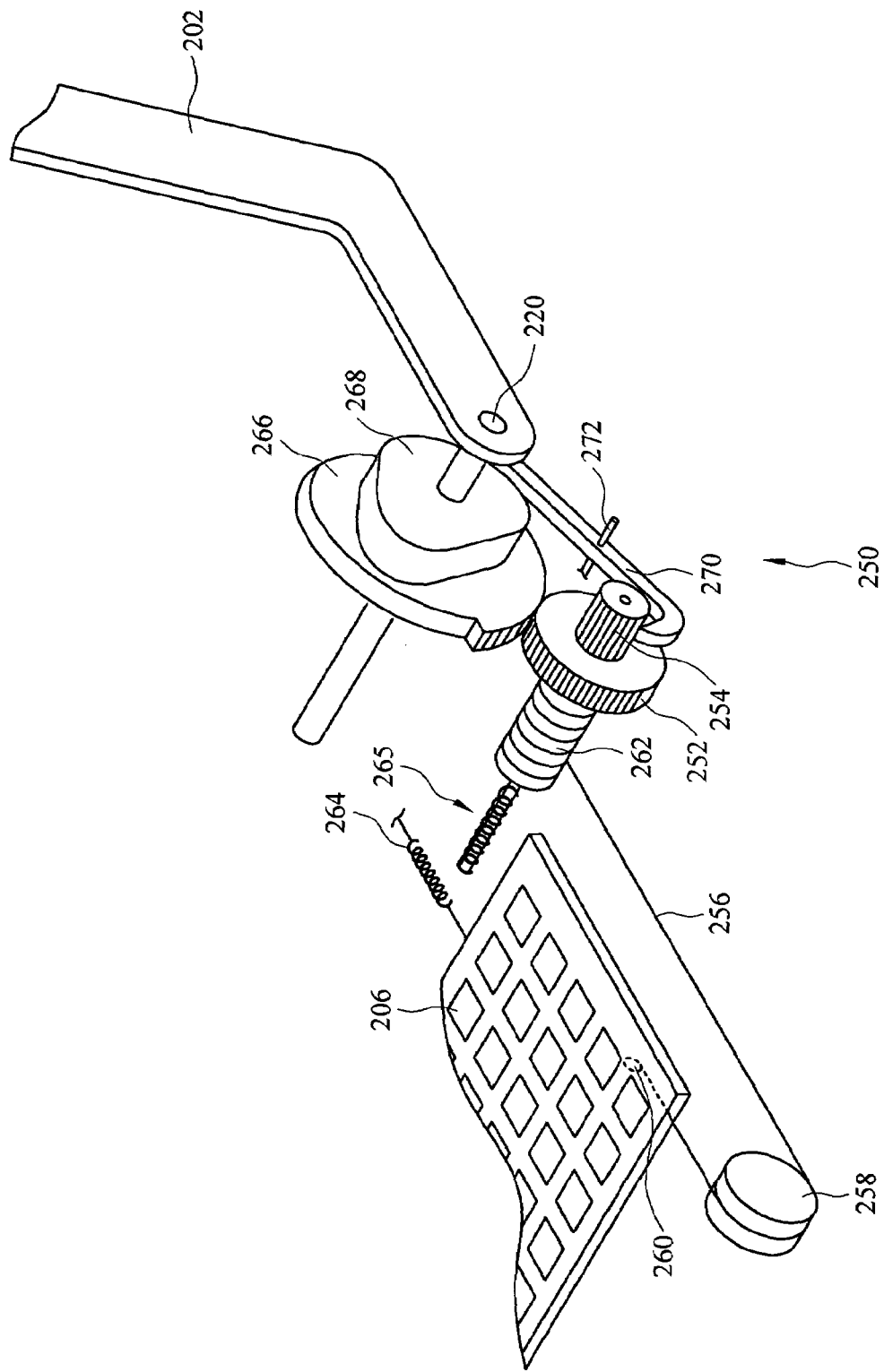
FIG. 4 is a schematic, cross-sectional view of an adjustment mechanism according to one preferred embodiment of this invention.

FIG. 4 is a schematic, cross-sectional view of an adjustment mechanism according to one preferred embodiment of this invention. The adjustment mechanism 250 is installed around a rotation shaft 220. A gear 266 and a cam 220 are mounted on the same rotation shaft 220. The adjustment mechanism 250 employs the cylinder 262 to roll a wire 256 so as to pull the keyboard 206 via a cylinder 258. One end of the wire 256 is rolled around the cylinder 262, a opposite end of the wire 256 is attached to the point 260 of the keyboard 206. When the panel is unfolded, the gear 266 drives the gear 252, and the cylinder 262 rotates simultaneously with the gear 252 to roll the wire 256 around itself. The gear 266 is a teeth-uncompleted gear, thus the gear 266 can drive the gear 252 to in predetermined range. When the gear 266 cannot reach the gear 252, the cam 268 pushes one end of a stop 270 so that an opposite end of the stop 270 prevents the gear 254 from rotating. When the panel 202 is folded on the base unit 204 again, a spring 264 and a torsion spring 265 provide a recovery force. The recovery force of the spring 264 is applied to the keyboard 206 directly. The recovery force of the spring torsion 265 is applied to the gear 262. Both the spring 264 and the torsion spring 265 provide the recovery force required by the keyboard 206.

Figure 5A:
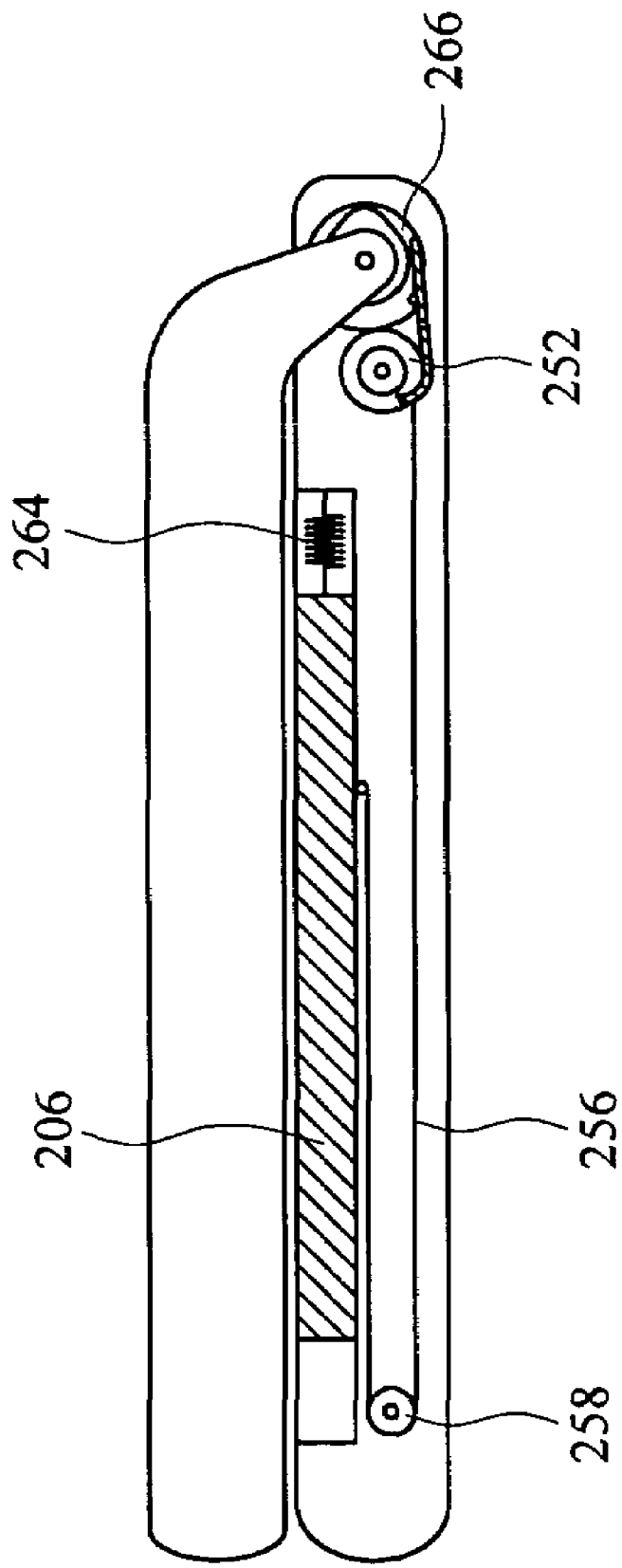
FIGS. 5A–5C are a series of schematic side views of different keyboard positions according to one preferred embodiment of this invention.
Figure 5B:
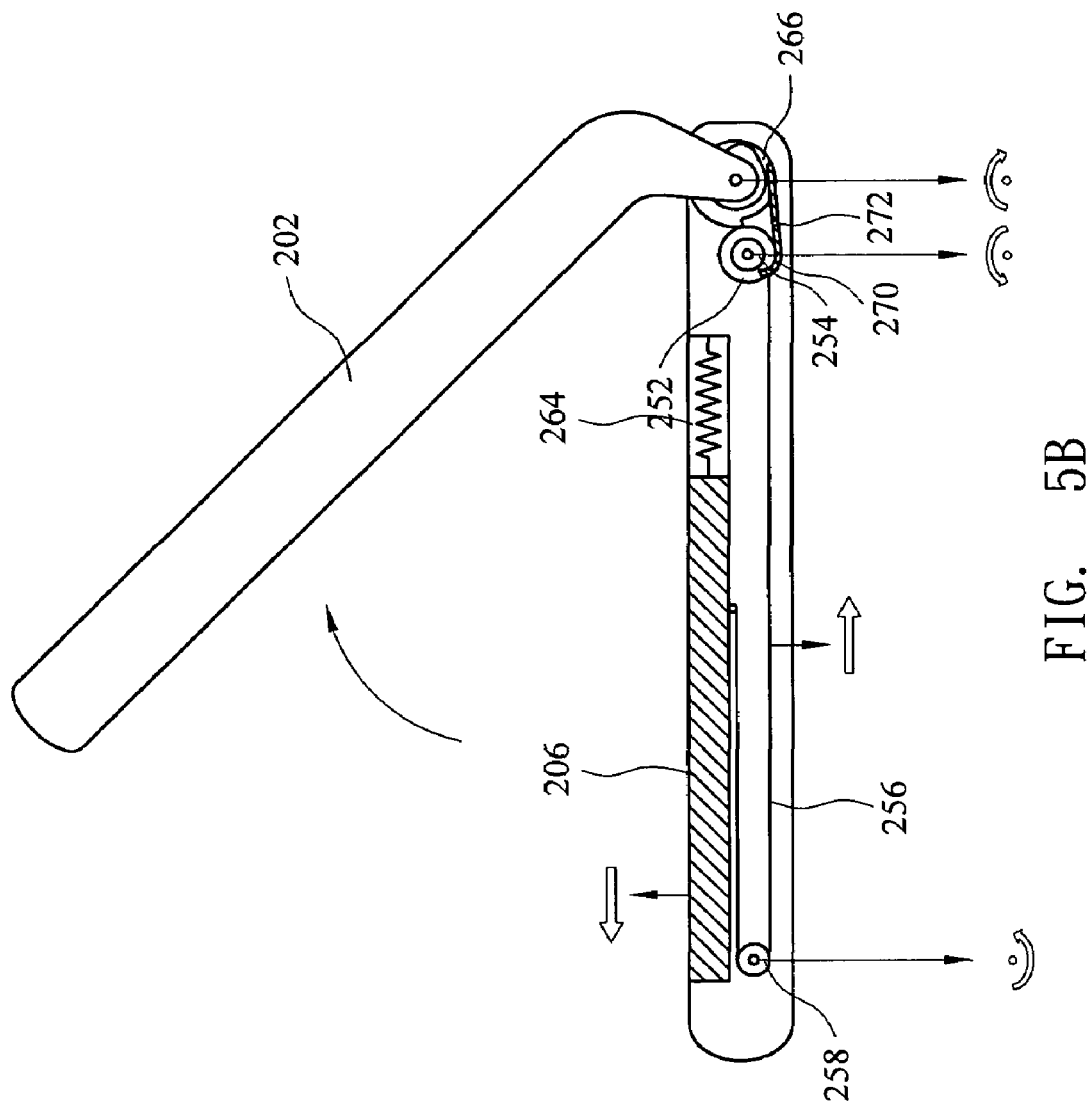
Figure 5C:
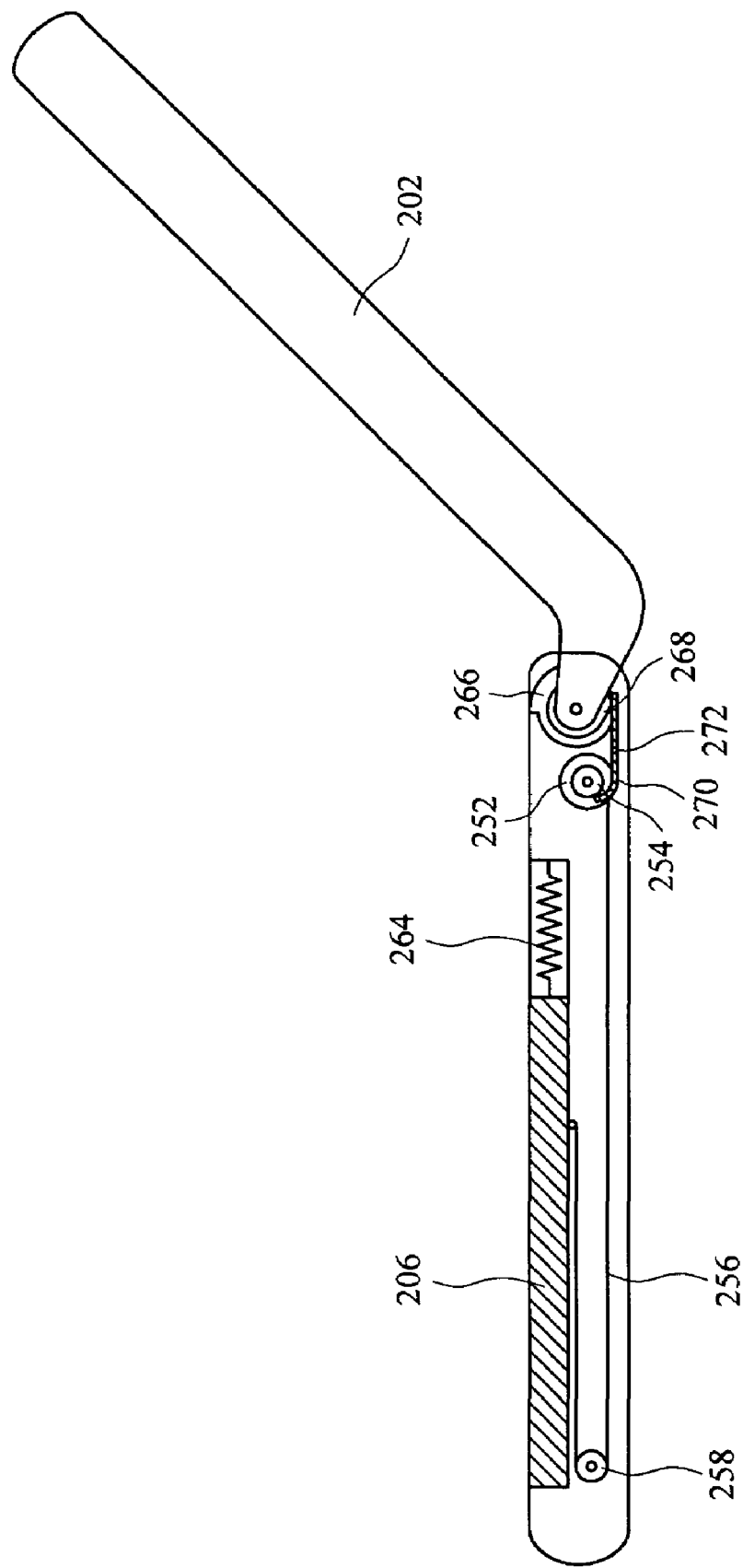

FIGS. 5A–5C are a series of schematic side views of different keyboard positions according to one preferred embodiment of this invention. Referring to FIG. 5A, when the panel is folded on the base unit, the adjustment mechanism provide a torsion friction that prevents the panel from easily opening (like a hinge of a conventional portable computer). The force of the spring 164 pulls the wire 256 and prevents the cylinder 252 from rotating via the cylinder 258 so that a torsion force is provided to stop the gear 166 from rotating. Moreover, the torsion spring 165 provides a torsion force to the cylinder 262, which torsion force also prevents the gear 252 from rotating (referring to FIG. 4). Thus, both the spring 264 and the torsion spring 265 provide torsion forces to prevent the panel from easily opening.

Referring to FIGS. 5A and 4, when the panel is unfolded on the base unit, the gear 266 rotates simultaneously with the panel 202, the gear 266 drives the gear 264, and the cylinder 262 rolls the wire 256. That is, the act of opening the panel 202 moves the keyboard 206 to the desired position for typing. The gear 266, the gear 264, the wire 256, the cylinder 258 and the keyboard 206 are operated according to the directions illustrated in FIG. 5, so that the keyboard 206 is moved to the desired position for typing.

Referring to FIGS. 5C and 4, as described above, the gear 266 is a teeth-uncompleted gear. Thus, when the panel is unfolded more than a predetermined angle, the gear 266 cannot reach the gear 264. Instead, the cam 268 drives the stop 270 to prevent the gear 254 from rotating. Because the stop 270 is pivotally connected with the base unit by a pivot 171, the cam 268 pushes one end of the stop 270, and the other end clamps on teeth of the gear 254. Because the friction between the cam 268 and the stop 270 provides a torsion force, the panel 202 can be positioned within a predetermined range (only when the gear 266 doesn't reach the gear 264).

According to preferred embodiments, when the portable computer with a position-adjustable keyboard is used, a user can enjoy a comfortable typing environment. Besides, the adjustment mechanism provides a torsion force to position the panel of the portable computer, on behalf of a hinge.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable computer with a position-adjustable keyboard, comprising:
   a base unit, having a keyboard section;
   a panel, pivotally connected with one end of said base unit by a rotation shaft;
   a keyboard, accommodated in said keyboard section; and
   an adjustment mechanism installed around said rotation shaft, said adjustment mechanism comprising:
      a first gear, mounted on and rotated simultaneously with said rotation shaft;
      a first cylinder, having a second gear rotated simultaneously therewith, said first gear and said second gear being driven by each other;
      a second cylinder, mounted on an opposite end of said base unit; and
      a wire, one end being secured to said keyboard and the other end being rolled around said first cylinder;
   wherein when said panel is unfolded from said base unit, said first gear is rotated simultaneously with said rotation shaft, said second gear is driven by said first gear, said first cylinder is rotated simultaneously with said second gear, said first cylinder rolls up said wire, said wire is pulled via said second cylinder, and said keyboard is moved by said wire.

2. The portable computer of claim 1, wherein said first gear is a teeth-uncompleted gear.

3. The portable computer of claim 2, wherein said adjustment mechanism comprises:
   a cam, mounted on and rotated simultaneously with said rotation shaft;
   a third gear, mounted on and rotated simultaneously with said first cylinder; and
   a stop, pivotally connected with said base unit and one end of said stop contacting said cam;
   wherein when said panel is unfolded from said base unit and said first gear does not reach said second gear, said cam pushes said one end of said stop, and an opposite end of said stop prevents said third gear from rotating.

4. A portable computer with a position-adjustable keyboard, providing a comfortable typing environment, said portable computer comprising:
   a base unit, having a keyboard section;
   a convex section, formed in said keyboard section;
   a panel, pivotally connected with one end of said base unit by a rotation shaft;
   a keyboard, accommodated in said keyboard section, said keyboard including a concave section to fit with said convex section, whereby said keyboard is level with an upper surface of said base unit when said panel is fold on said base unit; and
   an adjustment mechanism installed around said rotation shaft, said adjustment mechanism comprising:
      a first gear, mounted on and rotated simultaneously with said rotation shaft;
      a first cylinder, having a second gear rotated simultaneously therewith, said first gear and said second gear being driven by each other;
      a second cylinder, mounted on an opposite end of said base unit; and
      a wire, one end being secured to said keyboard and the other end being rolled around said first cylinder;
   wherein when said panel is unfolded from said base unit, said first gear is rotated simultaneously with said rotation shaft, said second gear is driven by said first gear, said first cylinder is rotated simultaneously with said second gear, said first cylinder rolls up said wire, said wire is pulled via said second cylinder, and said keyboard is moved by said wire and raised by said convex section.

5. The portable computer of claim 4, wherein said first gear is a teeth-uncompleted gear.

6. The portable computer of claim 5, wherein said adjustment mechanism comprises:
- a cam, mounted on and rotated simultaneously with said rotation shaft;
- a third gear, mounted on and rotated simultaneously with said first cylinder; and
- a stop, pivotally connected with said base unit and one end of said stop contacting said cam;

wherein when said panel is unfolded from said base unit and said first gear does not reach said second gear, said cam pushes said one end of said stop, and an opposite end of said stop prevents said third gear from rotating.

* * * * *